United States Patent Office 2,726,080
Patented Dec. 6, 1955

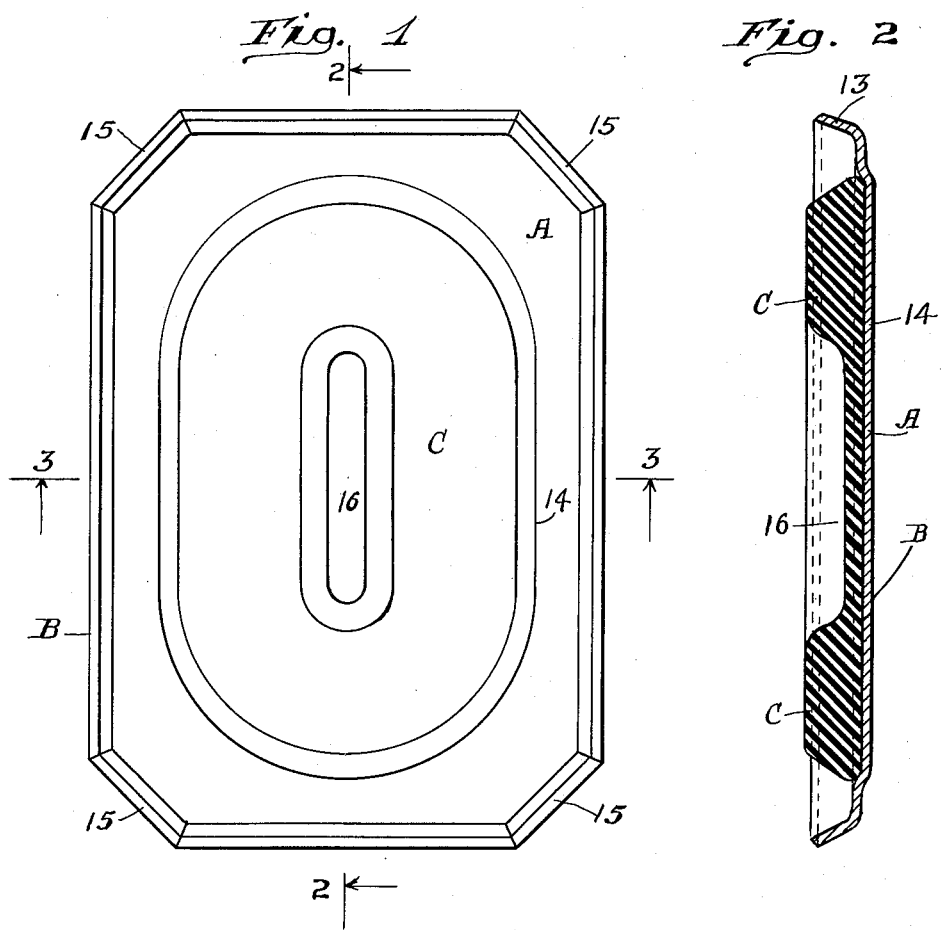

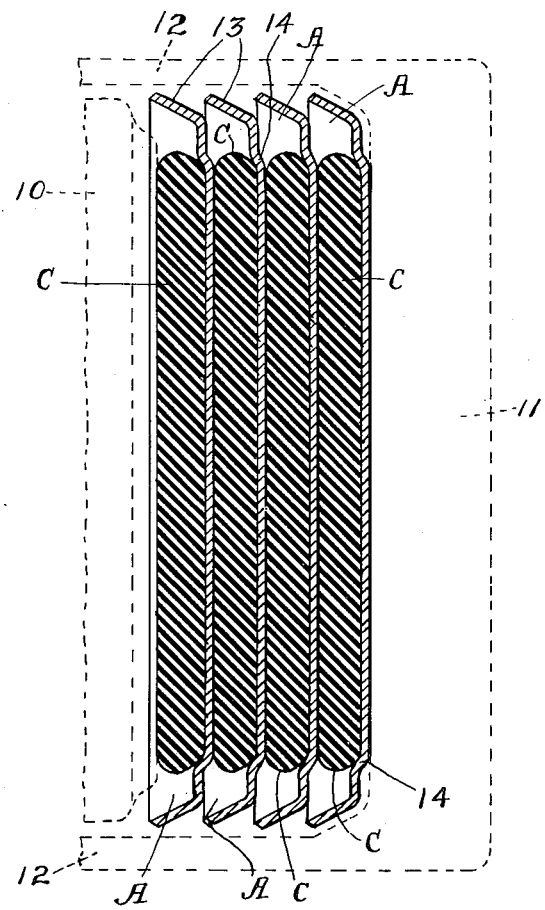

2,726,080

CUSHIONING MEANS FOR SHOCK ABSORBERS

William E. Withall, Hinsdale, Ill., assignor to W. H. Miner, Inc., Chicago, Ill., a corporation of Delaware Application March 13, 1952, Serial No. 276,430

2 Claims. (Cl. 267—1)

This invention relates to improvements in rubber cushioning means employed in shock absorbing mechanisms especially adapted for railway draft riggings.

One object of the invention is to provide a rubber cushioning means for shock absorbers, comprising a plurality of units arranged in series, wherein each unit of the series comprises a rubber pad seated in a pan-shaped spacing member having a peripheral flange, and wherein the pad is of smaller size in area than the spacing member to provide ample clearance between the pad and the peripheral flange of the spacing member for maximum outward expansion of the pad.

Another and more specific object of the invention is to provide a cushioning means of the character hereinbefore described, comprising a pan-shaped spacing member provided with an outstanding peripheral flange, and a rubber pad of smaller size in area contained within said pan-shaped spacing member and having its peripheral edge spaced inwardly from said flange of said spacing member, wherein the pan-shaped member is provided with a shallow depression in which said pad is seated and snugly fits to hold the pad centered in said pan-shaped member, thereby eliminating vulcanization or gluing of said pad to the spacing member to secure the same in the properly centered position.

Other objects of the invention will more clearly appear from the description and claims hereinafter following.

In the accompanying drawings forming a part of this specification, Figure 1 is a plan view of one of the cushioning units of my improved rubber shock absorber. Figure 2 is a longitudinal, transverse sectional view, corresponding substantially to the line 2—2 of Figure 1. Figure 3 is a transverse sectional view, corresponding substantially to the line 3—3 of Figure 1. Figure 4 is a transverse sectional view of a plurality of cushioning units of the design shown in Figure 1, arranged in series to form a complete shock absorber, said view illustrating the shock absorber in compressed condition between two follower members, illustrated in dotted lines.

Referring to the drawings, my improved shock absorbing unit, which unit is designated by A, comprises a pan-shaped spacing member B and a rubber pad C seated in said member. In the complete shock absorber, as shown in Figure 4, the units A are arranged in series. In Figure 4, the shock absorber is shown as comprising four units A—A—A—A, which are interposed between front and rear follower members 10 and 11, illustrated in dotted lines, the follower 11 having forwardly extending arms 12—12 embracing the shock absorber.

The pan-shaped spacing member B is in the form of a substantially rectangular plate having an outstanding peripheral flange 13 and a relatively shallow, central, depressed portion forming a seat 14 for the rubber pad C. As shown most clearly in Figure 1, the four corners of the pan-shaped member B are cut away or bevelled off, as indicated at 15, and the seat 14 is of oval shape in plan. The flange 13 of the pan-shaped member B is preferably flared outwardly so that the same may be telescoped with the flange of the adjacent unit when the units are arranged in series in the complete shock absorber, as shown in Figure 4.

The rubber pad C is in the form of a flat mat of oval outline in plan and is of such a size as to seat snugly in the shallow seat 14 of the member B so as to be imbedded in said seat with the major portion of said pad projecting outwardly of the seat. As shown in Figures 2 and 3, the pad C in uncompressed condition is preferably of such a thickness as to slightly protrude or project from the pan-shaped member B. The portion of the pad C, which is located exteriorly of the seat 14, has its edges bevelled off or inclined, as shown in Figures 2 and 3. The central portion of the pad C is cut out or recessed, as indicated at 16, this recess being elongated as shown and extending lengthwise of said pad.

Inasmuch as the pad C is engaged in the seat 14 of the pan-shaped member B, it is securely held in position against shifting on said member without being bonded thereto by being vulcanized in place as is the usual practice. A decided advantage is obtained in not bonding the pad to the spacing member in that the pad is subjected to less strain and abuse during compression.

In compression of my improved rubber shock absorbing unit as illustrated in Figure 4, the material of the pad C is flattened out, flowing into the space provided by the recess 16 and also being spread outwardly toward the peripheral flange 13 of the spacing member B. The pad C is made of such a size that it will not be spread to such an extent as to impinge against and be damaged by the flange 13 of said member B.

I claim:

1. In a rubber cushioning unit for shock absorbers, the combination with a pan-shaped spacing member having a shallow recessed central seat and an outstanding flaring peripheral flange; of a rubber pad within said member having a base portion snugly fitting said recessed seat, said pad being of lesser area than said pan-shaped member and having its outer edge spaced inwardly from the flange of said member, and beveled off in direction away from said flange.

2. In a rubber cushioning unit for shock absorbers, the combination with a rectangular pan-shaped spacing member having a platelike main body portion and a central recessed shallow seat of oval shape extending lengthwise of said member and depressed with respect to said platelike main body portion, said main body portion having an outstanding, outwardly flaring peripheral flange; of an oval rubber pad having a base portion closely fitting said recessed seat, the peripheral outer edge of said pad being beveled off in direction away from said base portion, said pad, in uncompressed condition, being of such a thickness as to protrude outwardly of said member beyond the plane of the edge of said peripheral flange.

References Cited in the file of this patent

UNITED STATES PATENTS

| | | |
|---|---|---|
| 2,187,156 | Johnson | Jan. 16, 1940 |
| 2,559,743 | Williams | July 10, 1951 |

FOREIGN PATENTS

| | | |
|---|---|---|
| 551,675 | France | Jan. 11, 1923 |
| 587,498 | Germany | Nov. 3, 1933 |